US012764462B2

(12) United States Patent
Chang et al.

(10) Patent No.: US 12,764,462 B2

(45) **Date of Patent: *Oct. 13, 2026**

(54) MICROPHONE MODULE

(71) Applicant: Merry Electronics(Shenzhen) Co., Ltd., ShenZhen (CN)

(72) Inventors: Chao-Sen Chang, Taichung (TW); Cheng Yuan Chan, Taichung (TW); Yueh-Kang Lee, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 155 days.

This patent is subject to a terminal disclaimer.

(21) Appl. No.: 18/908,779

(22) Filed: Oct. 7, 2024

(65) Prior Publication Data

US 2025/0358567 A1 Nov. 20, 2025

Related U.S. Application Data

(63) Continuation-in-part of application No. 18/740,541, filed on Jun. 12, 2024.

(30) Foreign Application Priority Data

May 20, 2024 (TW) ................................ 113118604

(51) Int. Cl.
*H04R 1/44* (2006.01)
*H04R 1/08* (2006.01)

(52) U.S. Cl.
CPC ............... *H04R 1/44* (2013.01); *H04R 1/083* (2013.01)

(58) Field of Classification Search
CPC . H04R 1/086; H04R 1/44; H04R 1/04; H04R 1/021; H04R 1/08; H04R 2201/003; H04R 2201/02
USPC ........................................ 381/322, 355, 189
See application file for complete search history.

(56) References Cited

U.S. PATENT DOCUMENTS

2016/0037243 A1* 2/2016 Lippert .................. H04R 1/023 381/166
2018/0081258 A1* 3/2018 Clyne ....................... G06F 3/16
2020/0002160 A1* 1/2020 Shiraishi ................ H04R 19/04
2022/0344861 A1* 10/2022 Chaware .............. H01R 12/716
2023/0188879 A1* 6/2023 Woo ....................... H05K 1/141 381/91

* cited by examiner

*Primary Examiner* — Norman Yu
(74) *Attorney, Agent, or Firm* — JCIPRNET

(57) ABSTRACT

Disclosed is a microphone module including a casing, a microphone, a drainage structure, a waterproof membrane and a limiting member. The casing has a recess. The microphone is disposed in the casing, and corresponds to the recess. The drainage structure is disposed at the casing and includes a first channel and a second channel communicated to each other. A first sound hole of the first channel is exposed from the casing, and a second sound hole of the second channel corresponds to the microphone. A waterproof membrane is disposed in the recess and located between the microphone and the second sound hole. The limiting member is disposed in the recess and located between the microphone and the waterproof membrane.

10 Claims, 11 Drawing Sheets

MICROPHONE MODULE

CROSS-REFERENCE TO RELATED APPLICATION

This application is a continuation in part application of and claims the priority benefit of U.S. application Ser. No. 18/740,541 filed on Jun. 12, 2024, which claims the priority benefit of Taiwan application serial no. 113118604, filed on May 20, 2024. The entirety of each of the above-mentioned patent applications is hereby incorporated by reference herein and made a part of this specification.

BACKGROUND

Technical Field

The disclosure relates to a microphone module.

Description of Related Art

Microphone modules may be disposed outside an object for voice reception. A microphone module includes a sound hole and a microphone. Sound waves from the external environment enter the microphone module through the sound hole and are transmitted to the microphone. Water currents and dust from the external environment also enter the microphone module through the sound hole, affecting the effect of voice reception of the microphone. Specifically, today's microphone modules have poor water drainage effects. As a result, when a water column of high temperature and high pressure enters the microphone module, the microphone is damaged due to the impact of the water column, resulting in the failure of the microphone module.

SUMMARY

The disclosure provides a microphone module to protect a microphone.

A microphone module of the disclosure including a casing, a microphone, a drainage structure, a waterproof membrane and a limiting member. The casing has a recess. The microphone is disposed in the casing, and corresponds to the recess. The drainage structure is disposed at the casing and includes a first channel and a second channel communicated to each other. A first sound hole of the first channel is exposed from the casing, and a second sound hole of the second channel corresponds to the microphone. A waterproof membrane is disposed in the recess and located between the microphone and the second sound hole. The limiting member is disposed in the recess and located between the microphone and the waterproof membrane.

Based on the above, the limiting member of the microphone module of the disclosure is disposed between the microphone and the waterproof membrane. Thereby, when the water column flows into the microphone module and impacts the waterproof membrane, the deformation range of the waterproof membrane may be limited due to contacting the limiting member. The limiting member supports the waterproof membrane to prevent the waterproof membrane from rupturing and damaging the microphone module.

DESCRIPTION OF THE EMBODIMENTS

Figure 1A:
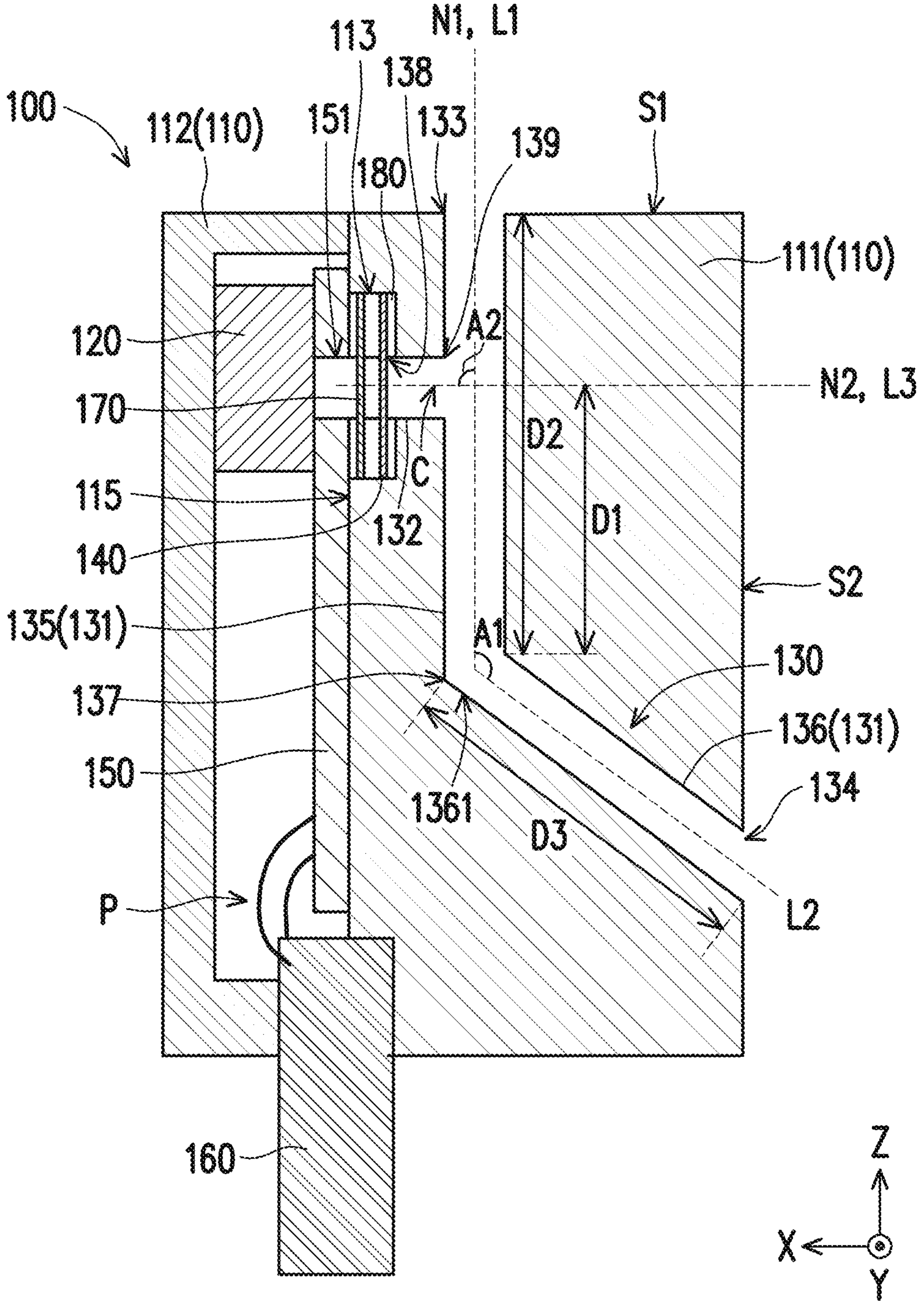
FIG. 1A is a cross-sectional view of a microphone module according to an embodiment of the disclosure.
Figure 1B:
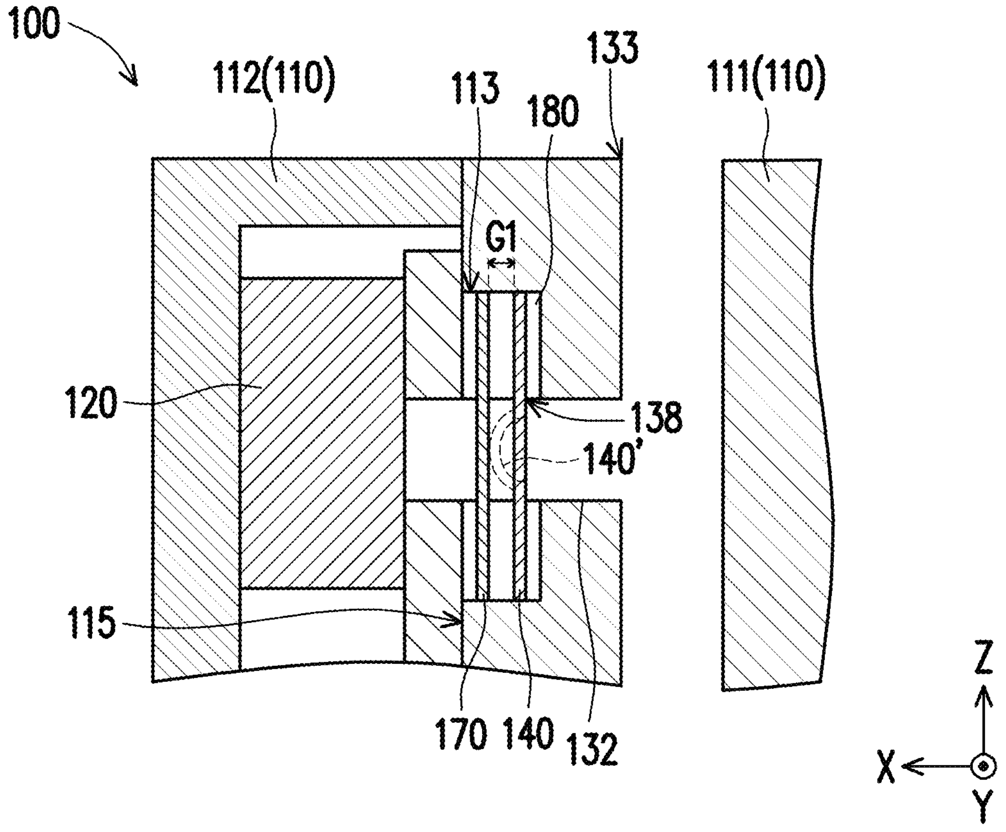
FIG. 1B is a partial enlarged view of the microphone module in FIG. 1A.
Figure 2:
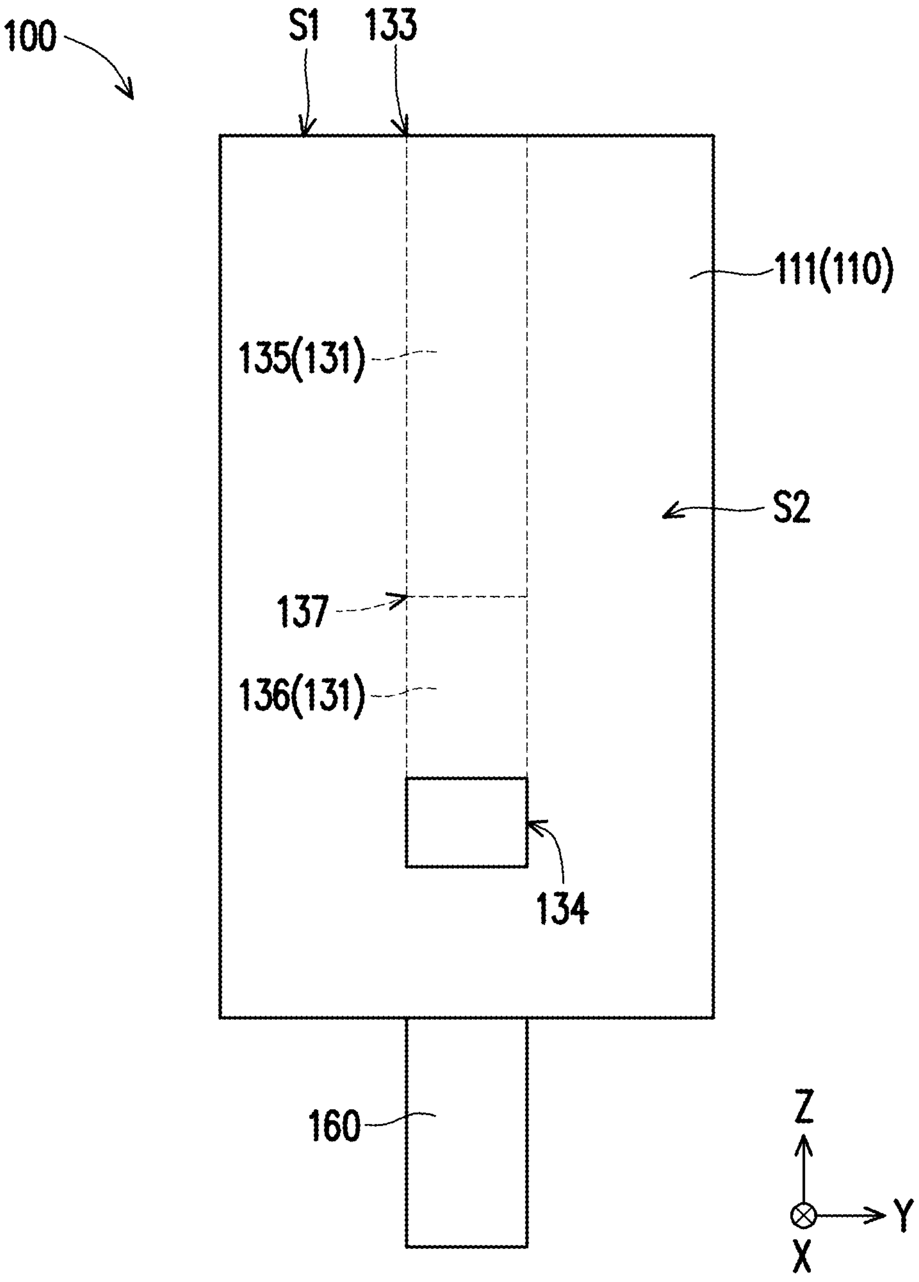
FIG. 2 is a rear view of the microphone module in FIG. 1A.
Figure 3:
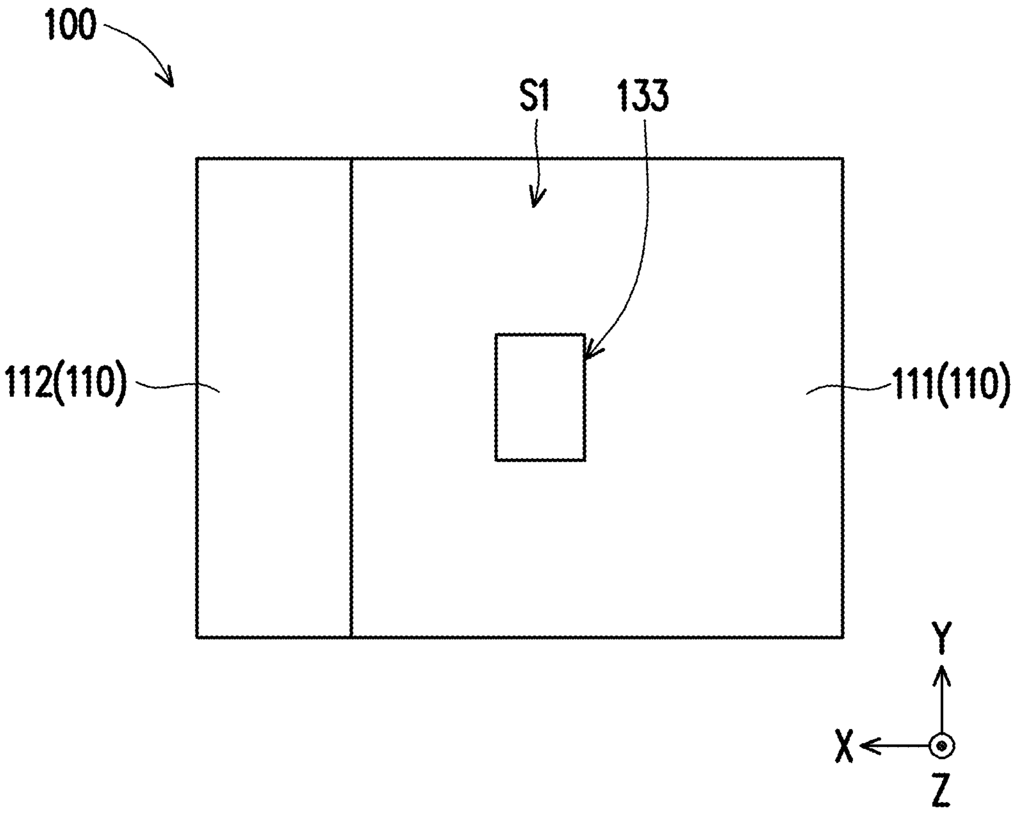
FIG. 3 is a top view of the microphone module in FIG. 1A.

FIG. 1A is a cross-sectional view of a microphone module according to an embodiment of the disclosure. FIG. 1B is a partial enlarged view of the microphone module in FIG. 1A. FIG. 2 is a rear view of the microphone module in FIG. 1A. FIG. 3 is a top view of the microphone module in FIG. 1A. A rectangular coordinate X-Y-Z is provided to facilitate the description of components. Referring to FIGS. 1A to 3 at the same time, a microphone module 100 includes a casing 110, a microphone 120, a drainage structure 130, a waterproof membrane 140 and a limiting member 170. The casing 110 has a recess 113. The microphone 120 is disposed in the casing 110 and corresponds to the recess 113. The drainage structure 130 is disposed on the casing 110 and includes a first channel 131 and a second channel 132, which are connected to each other. A first sound hole 133 and a drainage hole 134 of the first channel 131 are exposed from the casing 110. A second sound hole 138 of the second channel 132 corresponds to the microphone 120. The waterproof membrane 140 is disposed on the recess 113 and located between the microphone 120 and the second sound hole 138 to protect the microphone 120. The limiting member 170 is disposed in the recess 113 and located between the microphone 120 and the waterproof membrane 140 to protect the waterproof membrane 140.

A first normal line N1 of the first sound hole 133 is perpendicular to a second normal line N2 of the second sound hole 138, causing the first sound hole 133 and the second sound hole 138 to stagger from each other. The first normal line N1 is parallel to a Z-axis, and the second normal line N2 is parallel to an X-axis. The first sound hole 133 and the drainage hole 134 are connected to the external environment. Sound waves from the external environment enter the microphone module 100 through the first sound hole 133. After being transmitted to the second sound hole 138 through the drainage structure 130, the sound waves are transmitted to the microphone 120. Rainwater or dust from the external environment may also enter the microphone module 100 through the first sound hole 133. In general, since the first sound hole 133 and the second sound hole 138 stagger from each other, when external water column and dust enter the microphone module 100, the water column and dust move along the first channel 131 and exit the microphone module 100 through the drainage hole 134 without affecting the microphone 120, allowing the microphone module 100 to maintain a good quality of voice reception.

When the water column entering the microphone module 100 is too strong, the water column would flow into the second channel 132 and impact the waterproof membrane 140. In this embodiment, when the water column impacts the waterproof membrane 140 and causes the waterproof membrane 140 to deform, the limiting member 170 is used to support the waterproof membrane 140 to limit a deformation amount of the waterproof membrane 140, that prevent the waterproof membrane 140 from being excessively deformed and damaged, thereby damaging the microphone 120. Through the limiting member 170, the microphone module 100 in this embodiment may achieve a highest rating of IP69K regarding waterproofing and dustproofing.

As shown in FIGS. 1A and 2, the microphone module 100 further includes a circuit board 150 and a circuit assembly 160. The casing 110 includes a first casing 111 and a second casing 112 connected to each other. The material of the first casing 111 and the second casing 112 may be plastic, but is not limited thereto. The second casing 112 and the first casing 111 form a cavity P together. The microphone 120 is located in the cavity P. The first casing 111 of the casing 110 includes a first outer surface S1 and a second outer surface S2 connected to each other, and an inner surface 115 having the recess 113. The first sound hole 133 is located on the first outer surface S1, and the drainage hole 134 is located on the second outer surface S2. However, the disclosure is not limited thereto. The drainage structure 130 and the waterproof membrane 140 are embedded in the first casing 111. The circuit board 150 is disposed in the cavity P of the casing 110 and located between the limiting member 170 and the microphone 120. The circuit board 150 includes an opening 151 that corresponds to the second sound hole 138. The microphone 120 is connected to the circuit board 150 and covers the opening 151. A diameter of the opening 151 is greater than or equal to 0.6 millimeters. The circuit assembly 160 is at least partially disposed in the cavity P of the casing 110.

FIG. 1B shows the deformed waterproof membrane 140' with a dotted line. As shown in FIG. 1B, there is a first gap G1 between the limiting member 170 and the waterproof membrane 140, and the first gap G1 is greater than or equal to 0.1 mm and less than or equal to 1 mm. When the water column impacts the waterproof membrane 140', the waterproof membrane 140' may deform and contact the limiting member 170. Compared with the modern microphone module without the limiting member 170, the limiting member 170 of the embodiment limits the waterproof membrane 140 from being ruptured due to excessive deformation, so the waterproof membrane 140 may withstand the impact of a stronger water column to protect the microphone module 100.

A rigidity of the limiting member 170 is greater than a rigidity of the waterproof membrane 140, and the rigidity of the limiting member 170 may be greater than 50 MPa, for example. An air permeability of the limiting member 170 is greater than an air permeability of the waterproof membrane 140 to prevent the limiting member 170 from affecting a sensitivity of the microphone 120. The air permeability of the limiting member 170 may be greater than 100 mm/s, for example. A material of the limiting member 170 is, for example, a mesh fabric, but is not limited thereto.

The first channel 131 of the drainage structure 130 includes a first portion 135 and a second portion 136, which are connected to each other. The first portion 135 is connected to the first sound hole 133 and the second channel 132 and extends along a first extension axis L1. The first portion 135 intersects the second channel 132 at a first connection end 139 and intersects the second portion 136 at a second connection end 137. The second portion 136 is connected to the drainage hole 134 and extends along a second extension axis L2. The first sound hole 133 and the second connection end 137 are connected to two opposite ends of the first channel 131. The second connection end 137 and the drainage hole 134 are connected to two opposite ends of the second channel 132. In this embodiment, the first extension axis L1 coincides with the first normal line N1 and is parallel to the Z-axis. The second extension axis L2 is different from the first extension axis L1. However, the disclosure is not limited thereto. An included angle A1 is formed between the first extension axis L1 and the second extension axis L2. The included angle A1 is greater than 90 degrees and less than 180 degrees. Thus, the included angle A1 is an obtuse angle.

As shown in FIG. 1A, the second channel 132 extends along a third extension axis L3. An angle A2 is formed between the third extension axis L3 and the first normal line N1. The angle A2 may be greater than 0 degrees and less than or equal to 90 degrees. The first connection end 139 and the second sound hole 138 are connected to the opposite ends of the second channel 132. In this embodiment, the third extension axis L3 coincides with the second normal line N2 of the second sound hole 138 and is parallel to the X-axis, but is not limited thereto. That is, an included angle between the second normal line N2 and the third extension axis L3 is zero degrees. The angle A2 between the third extension axis L3 (the second normal line N2) and the first normal line N1 is 90 degrees.

The first connection end 139 is spaced at a distance D1 from the second connection end 137. The distance D1 is greater than or equal to 3 millimeters. Specifically, a center C of the first connection end 139 is spaced at the distance D1 from the second connection end 137. The center C is located on the third extension axis L3. That is, the third extension axis L3 is spaced at the distance D1 from the second connection end 137. When an external high-pressure water column enters the first portion 135 through the first sound hole 133 and impacts a bottom surface 1361 of the second portion 136, the distance D1 helps prevent water from flowing back into the second channel 132, thereby protecting the microphone 120.

A combination of a length D2 of the first portion 135 along the first extension axis L1 and a length D3 of the second portion 136 along the second extension axis L2 is less than or equal to 17 millimeters, so as to avoid resonance frequencies that generate standing waves and further affect the quality of voice reception of the microphone module 100. A width of the second channel 132 perpendicular to the third extension axis L3 falls between 2 millimeters and 4 millimeters so as to prevent water from splashing into the second channel 132. As shown in FIGS. 2 and 3, the shapes of the first sound hole 133 and the drainage hole 134 may be rectangular, but are not limited thereto. A width of the first sound hole 133 is preferably between 0.4 millimeters and 2 millimeters to prevent overlarge dust or stones from entering the microphone module 100 through the first sound hole 133. In an unillustrated embodiment, the shapes of the first sound hole 133, the drainage hole 134, and the second sound hole 138 may be circular or any polygonal shape.

The microphone module 100 further includes a multi-layer colloid 180. The multi-layer colloid 180 is disposed in a partial area of the recess 113 of the casing 110. The waterproof membrane 140 and the limiting member 170 are respectively sandwiched between any two layers of the multi-layer colloid 180 and connected to the casing 110 through the multi-layer colloid 180. The multi-layer glue 180 is, for example, an adhesive, a waterproof adhesive, a double-sided tape or a glue, and disposed in the first casing 111 to bond the waterproof membrane 140 and the limiting member 170 to the first casing 111 respectively.

Figure 4A:
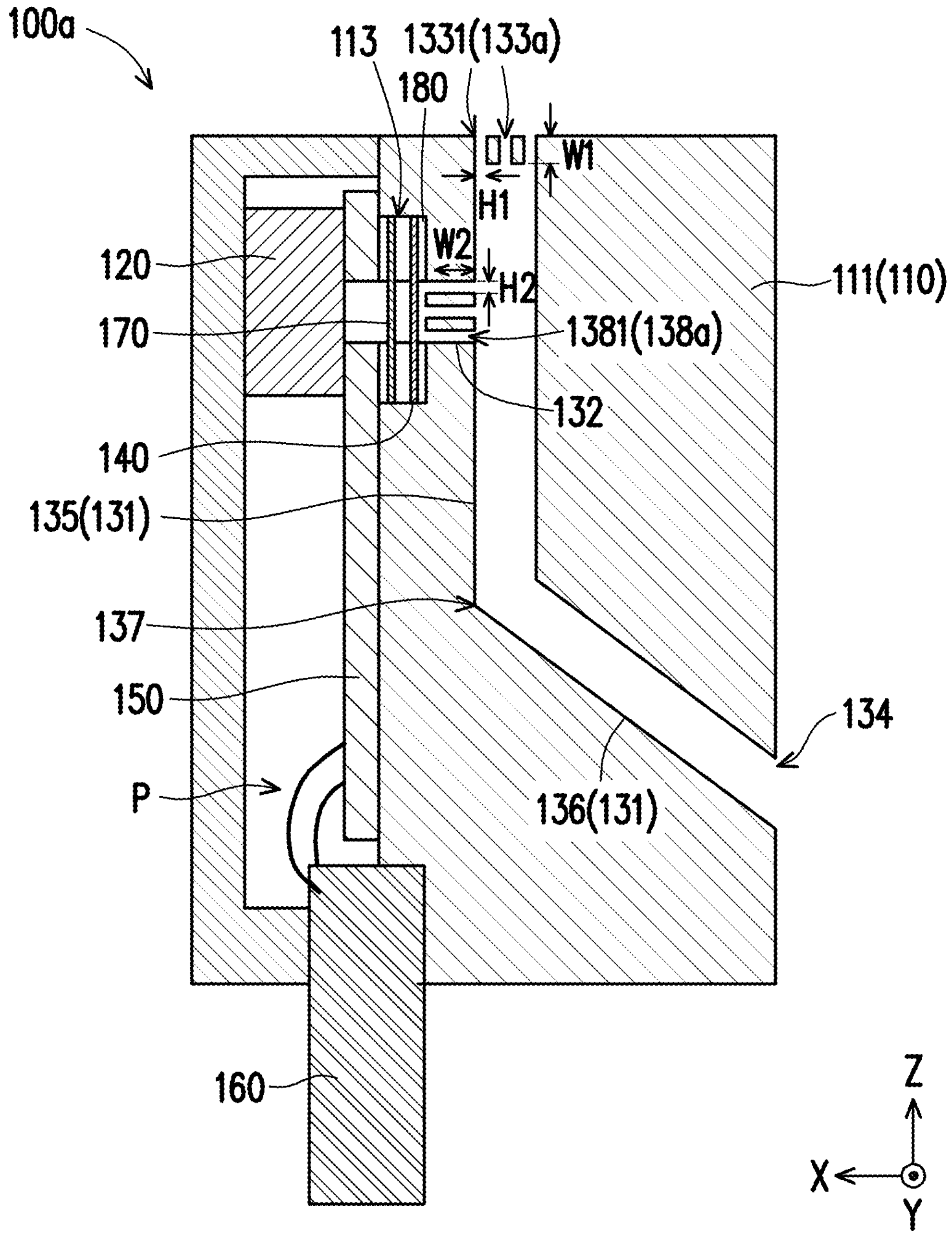
FIG. 4A is a cross-sectional view of a microphone module according to another embodiment of the disclosure.
Figure 4B:
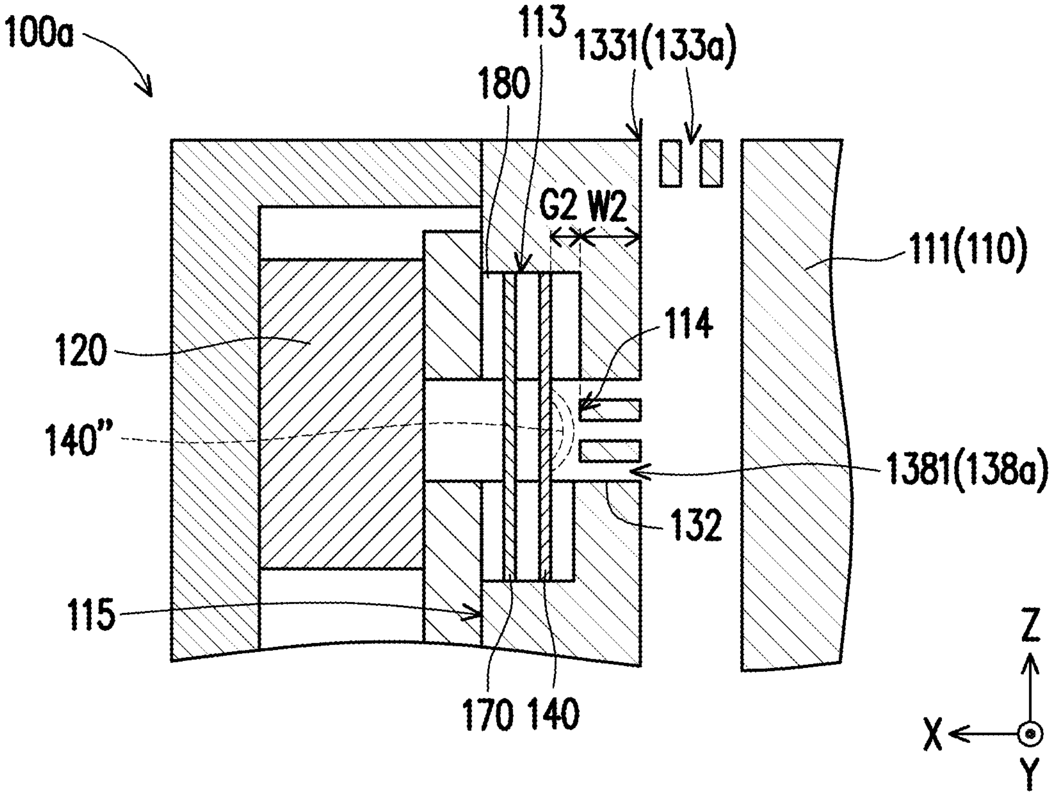
FIG. 4B is a partial enlarged view of the microphone module in FIG. 4A.
Figure 5:
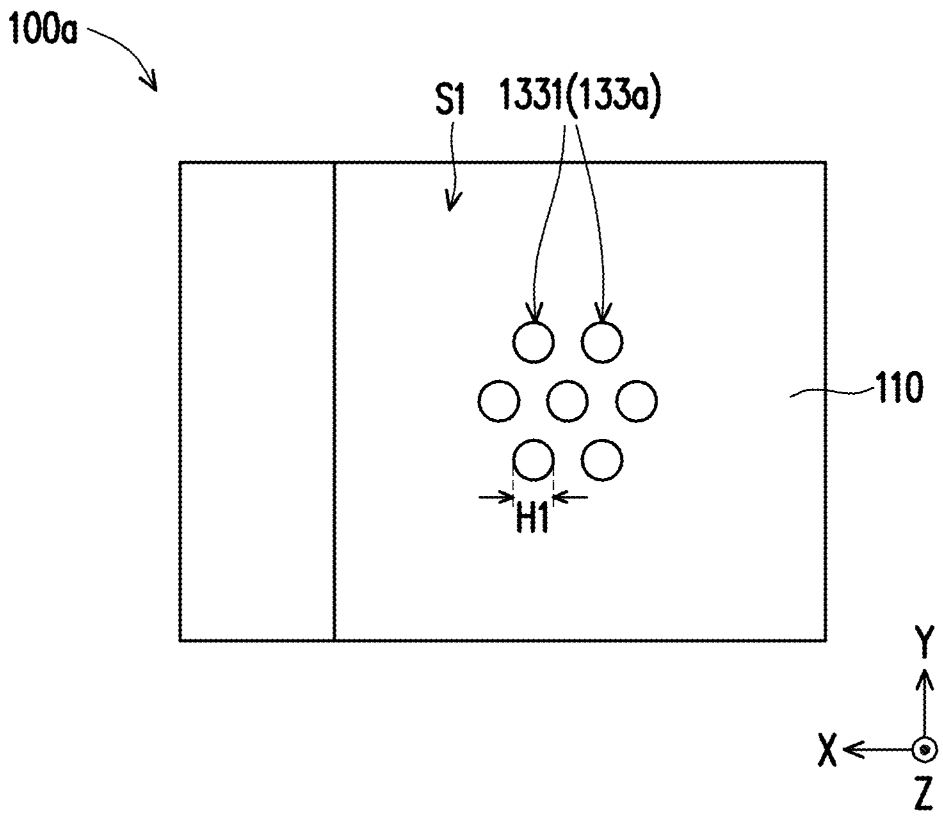
FIG. 5 is a top view of the microphone module in FIG. 4A.

FIG. 4A is a cross-sectional view of a microphone module according to another embodiment of the disclosure. FIG. 4B is a partial enlarged view of the microphone module in FIG. 4A. FIG. 5 is a top view of the microphone module in FIG. 4A. Referring to FIGS. 1A, 4A to 5 at the same time, a microphone module 100*a* in this embodiment is similar to the microphone module in the previous embodiment, with the difference being that in this embodiment, a first sound hole 133*a* includes multiple first sub-sound holes 1331, and a second sound hole 138*a* includes multiple second sub-sound holes 1381. The recess 113 of the casing 110 includes a bottom surface 114, and the second sub-sound holes 1381 are formed on the bottom surface 114 of the recess 113. There is a second gap G2 between the waterproof membrane 140 and the bottom surface 114. The second gap G2 is greater than or equal to 0.1 mm and less than or equal to 3 mm. Specifically, the second gap G2 of the embodiment is greater than or equal to 0.5 mm and less than or equal to 3 mm, but is not limited thereto. In other embodiments, the second gap G2 may be greater than or equal to 0.1 mm and less than or equal to 1 mm.

FIG. 4B shows the deformed waterproof membrane 140" with a dotted line. As shown in FIG. 4B, when the water column leaves the second channel 132 and causes the waterproof membrane 140 to deform, the second gap G2 may prevent the deformed waterproof membrane 140" from contacting and sticking to the bottom surface 114 of the depression 113. That is to say, the deformation range of the waterproof membrane 140" is smaller than the second gap G2. Thereby, the sound characteristics of the microphone 120 may be prevented from being affected.

As shown in FIG. 4A, a diameter H1 (i.e., a width of the first sub-sound hole 1331 perpendicular to the first normal line N1) of each first sub-sound hole 1331 falls between 0.2 millimeters and 1 millimeter, and a depth W1 (i.e., a length of the first sub-sound hole 1331 along the first normal line N1) of each first sub-sound hole 1331 falls between 0.5 millimeters and 1 millimeter. A diameter H2 (i.e., a width of the second sub-sound hole 1381 perpendicular to the second normal line N2) of each second sub-sound hole 1381 falls between 0.2 millimeters and 1 millimeter, and a depth W2 (i.e., a length of the second sub-sound hole 1381 along the second normal line N2) of each second sub-sound hole 1381 falls between 0.5 millimeters and 1 millimeter. Accordingly, when external water columns pass through the first sound hole 133*a* and the second sound hole 138*a*, the first sub-sound holes 1331 and the second sub-sound holes 1381 reduce the impact force of the water columns, thereby protecting the microphone 120. The microphone module 100*a* in this embodiment has the same effects as the microphone module in the previous embodiment, and further descriptions are not repeated herein.

Figure 6:
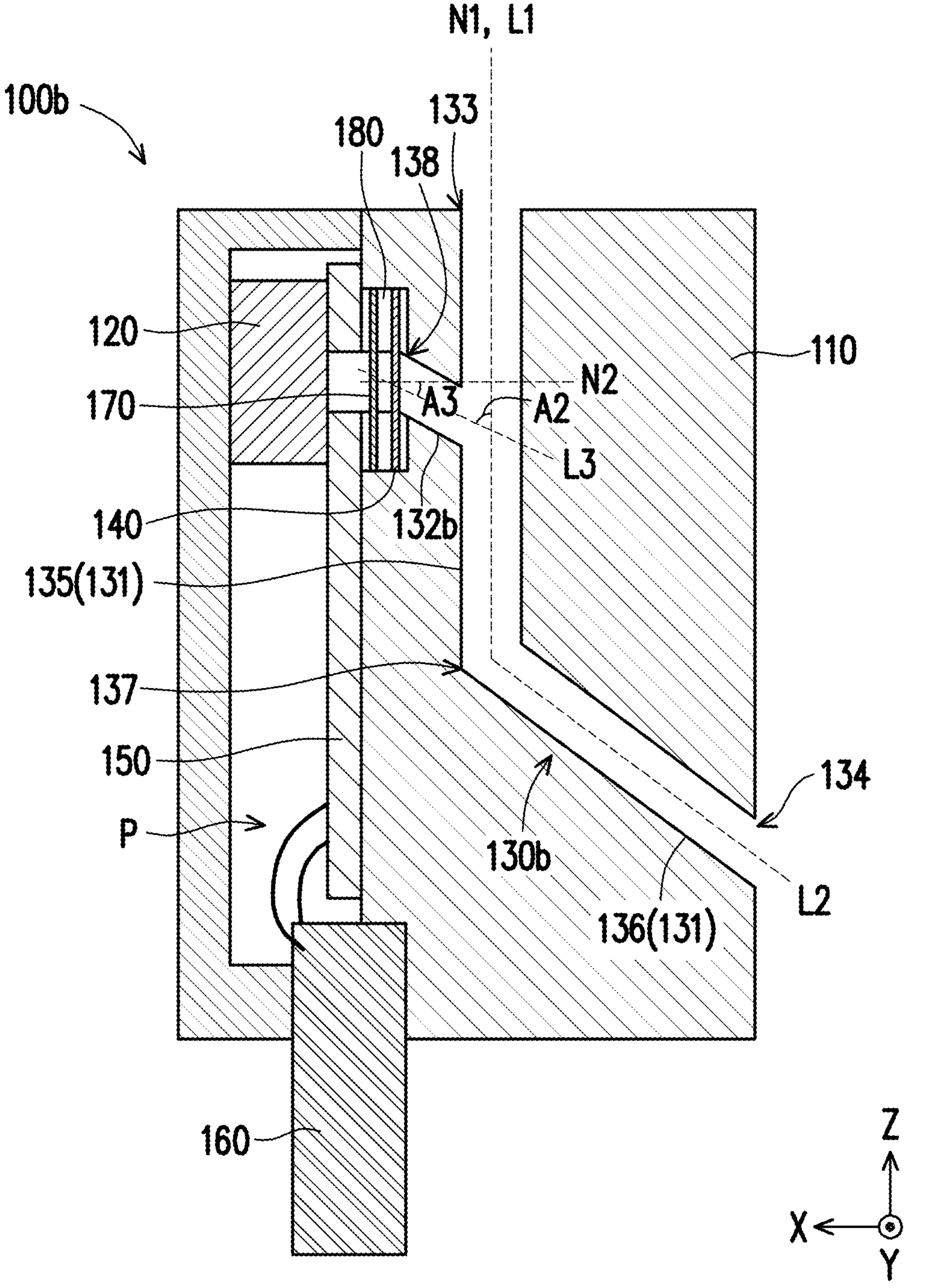
FIG. 6 is a cross-sectional view of a microphone module according to another embodiment of the disclosure.

FIG. 6 is a cross-sectional view of a microphone module according to another embodiment of the disclosure. Referring to FIGS. 1A and 6 at the same time, a microphone module 100*b* in this embodiment is similar to the microphone module in the previous embodiment, with the difference being that in this embodiment, the second normal line N2 of the second sound hole 138 is different from the third extension axis L3 of a second channel 132*b*. An included angle A3 between the second normal line N2 and the third extension axis L3 is greater than 0 degrees and less than 90 degrees. The angle A2 between the third extension axis L3 and the first normal line N1 is greater than 0 degrees and less than 90 degrees. Thus, the angle A2 is an acute angle. Accordingly, when external water columns enter a drainage structure 130*b*, water may further be prevented from flowing into the second sound hole 138 through the second channel 132*b* and damaging the microphone 120. The microphone module 100*b* in this embodiment has the same effects as the microphone module in the previous embodiment, and further descriptions are not repeated herein.

Figure 7:
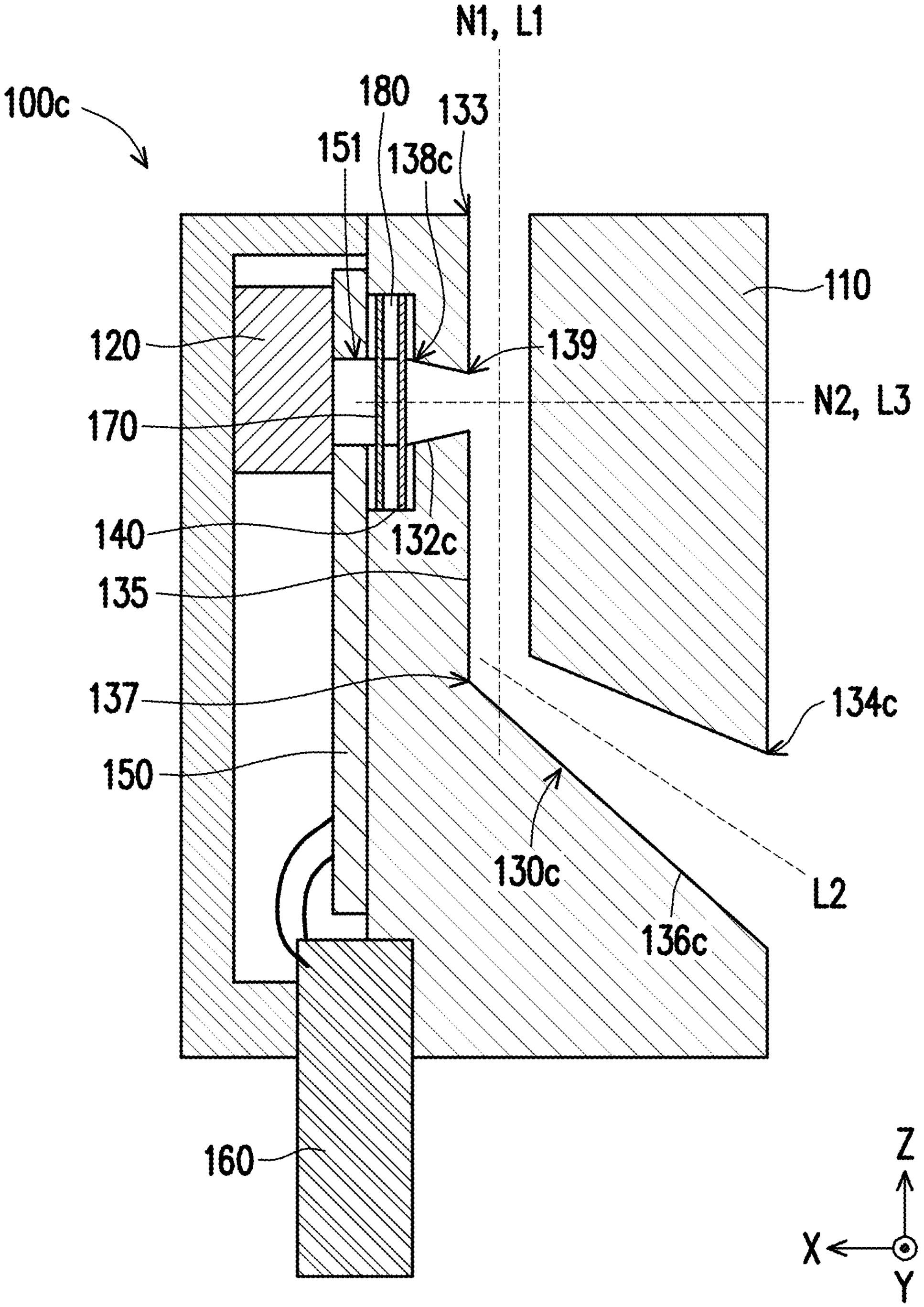
FIG. 7 is a cross-sectional view of a microphone module according to another embodiment of the disclosure.

FIG. 7 is a cross-sectional view of a microphone module according to another embodiment of the disclosure. Referring to FIGS. 1A and 7 at the same time, a microphone module 100*c* in this embodiment is similar to the microphone module in the previous embodiment, with the difference being that in this embodiment, a width of a second portion 136*c* of a drainage structure 130*c* perpendicular to the second extension axis L2 changes along the second extension axis L2. A width of a second channel 132*c* perpendicular to the third extension axis L3 changes along the third extension axis L3. Specifically, the width of the second portion 136*c* gradually increases along the second extension axis L2 from the second connection end 137 to a drainage hole 134*c*, with a width of the second connection end 137 being less than a width of the drainage hole 134*c*. The width of the second channel 132*c* gradually increases along the third extension axis L3 from the first connection end 139 to a second sound hole 138*c*, with a width of the first connection end 139 being less than a width of the second sound hole 138*c*. In an unillustrated embodiment, the width of the second portion 136*c* may gradually increase along the third extension axis L3 from the second sound hole to the first connection end 139, with the width of the second sound hole being less than the width of the first connection end 139. The microphone module 100*c* in this embodiment has the same effects as the microphone module in the previous embodiment, and further descriptions are not repeated herein.

Figure 8:
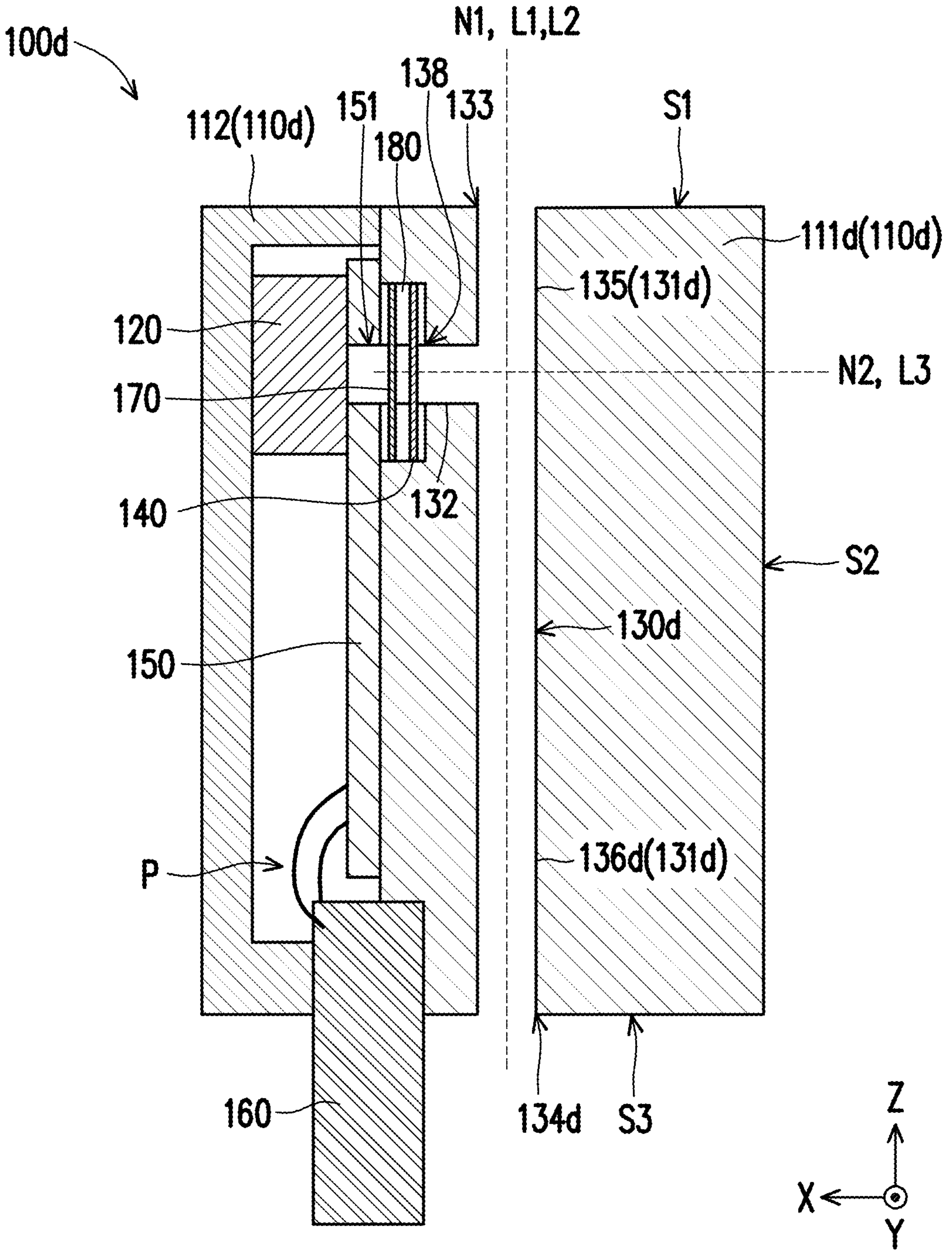
FIG. 8 is a cross-sectional view of a microphone module according to another embodiment of the disclosure.

FIG. 8 is a cross-sectional view of a microphone module according to another embodiment of the disclosure. Referring to FIGS. 1A and 8 at the same time, a microphone module 100*d* in this embodiment is similar to the microphone module in the previous embodiment, with the difference being that in this embodiment, a first channel 131*d* of a drainage structure 130*d* extends along the first normal line N1 of the first sound hole 133, and a drainage hole 134*d* is located on the first normal line N1. In other words, the first normal line N1, the first extension axis L1, and the second extension axis L2 coincide with each other. The included angle between the first extension axis L1 and the second extension axis L2 is 180 degrees. A first casing 111*d* of a casing 110*d* further includes a third outer surface S3. The third outer surface S3 is opposite to the first outer surface S1. The second outer surface S2 is connected between the first outer surface S1 and the third outer surface S3. The first sound hole 133 is located on the first outer surface S1, and the drainage hole 134*d* is located on the third outer surface S3. The microphone module 100*d* in this embodiment has the same effects as the microphone module in the previous embodiment, and further descriptions are not repeated herein.

Figure 9:
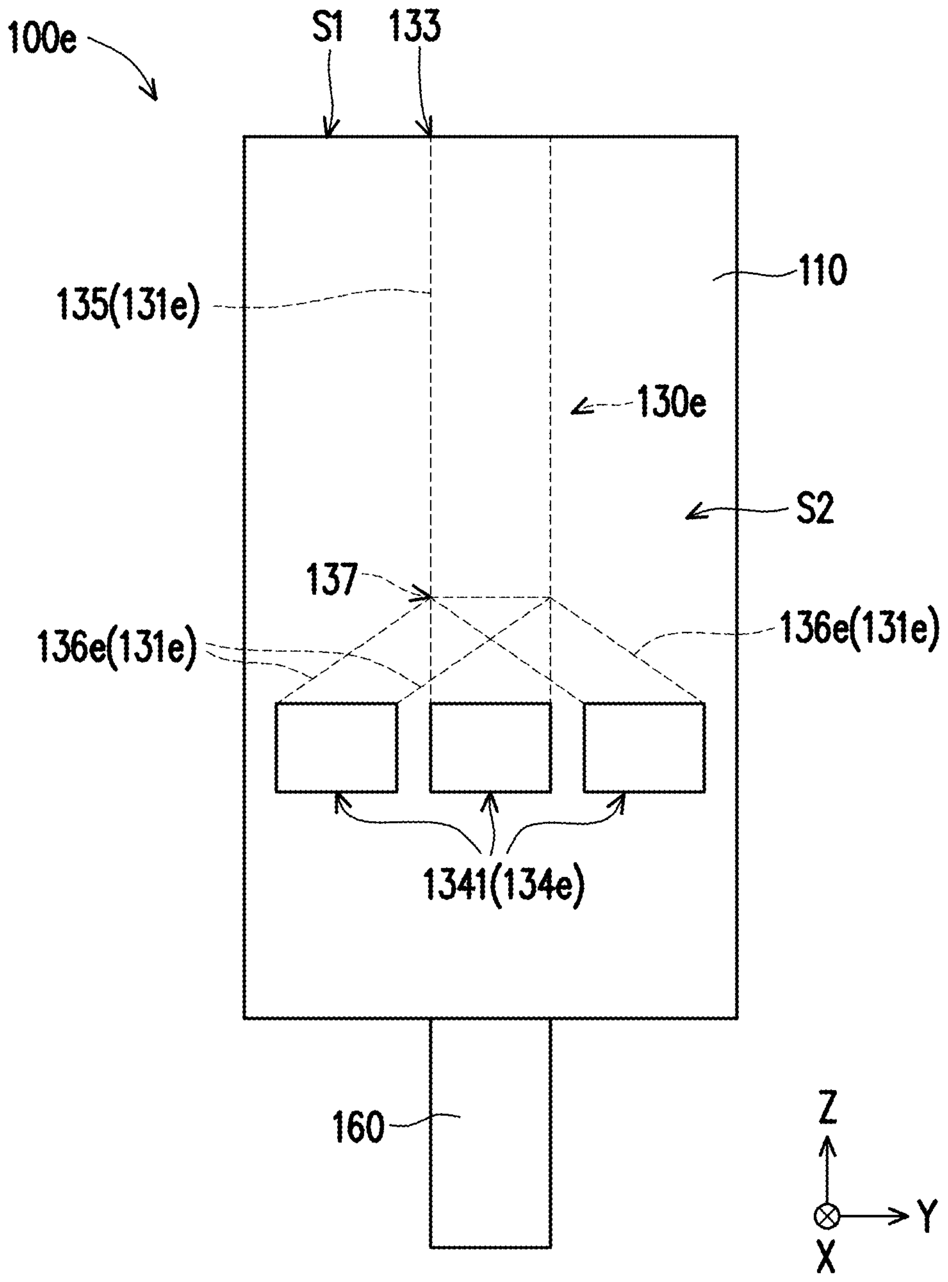
FIG. 9 is a cross-sectional view of a microphone module according to another embodiment of the disclosure.

FIG. 9 is a cross-sectional view of a microphone module according to another embodiment of the disclosure. Referring to FIGS. 2 and 9 at the same time, a microphone module

100*e* in this embodiment is similar to the microphone module in the previous embodiment, with the difference being that in this embodiment, a first channel 131*e* of a drainage structure 130*e* includes multiple second portions 136*e*. A drainage hole 134*e* includes multiple sub-drainage holes 1341. The second portions 136*e* intersect the first portion 135 at the second connection end 137 and are connected to the sub-drainage holes 1341 respectively. The number of the sub-drainage holes 1341 is, for example, three. The number of the second portions 136*e* is, for example, three. However, the disclosure is not limited thereto. A combination of a length of each second portion 136*e* and a length of the first portion 135 is 17 millimeters. The microphone module 100*e* in this embodiment has the same effects as the microphone module in the previous embodiment, and further descriptions are not repeated herein.

The disposition methods of the drainage structures 130, 130*b*, 130*c*, 130*d*, and 130*e* of the microphone modules 100, 100*a*, 100*b*, 100*c*, 100*d*, and 100*e* are not limited to the above embodiments. The structures of the first sound holes 133 and 133*a*, the second sound holes 138 and 138*a*, the second channels 132, 132*b*, and 132*c*, and the second portions 136, 136*c*, 136*d*, and 136*e* may be any combinations of the above embodiments.

In summary, the limiting member of the microphone module of the disclosure is disposed between the microphone and the waterproof membrane. Thereby, when the water column flows into the microphone module and impacts the waterproof membrane, the deformation range of the waterproof membrane may be limited due to contacting the limiting member. The limiting member supports the waterproof membrane to prevent the waterproof membrane from rupturing and damaging the microphone module.

What is claimed is:

1. A microphone module, comprising:

a casing, having a recess;

a microphone, disposed in the casing and corresponds to the recess;

a drainage structure, disposed on the casing and comprising a first channel and a second channel connected to each other, wherein a first sound hole of the first channel is exposed from the casing, and a second sound hole of the second channel corresponds to the microphone;

a waterproof membrane, disposed in the recess and located between the microphone and the second sound hole; and a limiting member, disposed in the recess and located between the microphone and the waterproof membrane, wherein a material of the limiting member is a mesh fabric.

2. The microphone module according to claim 1, wherein there is a first gap between the limiting member and the waterproof membrane, and the first gap is greater than or equal to 0.1 mm and less than or equal to 1 mm.

3. The microphone module according to claim 1, wherein a rigidity of the limiting member is greater than a rigidity of the waterproof membrane, and the rigidity of the limiting member is greater than 50 MPa.

4. The microphone module according to claim 1, wherein an air permeability of the limiting member is greater than an air permeability of the waterproof membrane, and the air permeability of the limiting member is greater than 100 mm/s.

5. The microphone module according to claim 1, wherein the first sound hole comprises a plurality of first sub-sound holes, and the second sound hole comprises a plurality of second sub-sound holes.

6. The microphone module according to claim 5, wherein the plurality of second sub-sound holes are formed on a bottom surface of the recess.

7. The microphone module according to claim 6, wherein there is a second gap between the waterproof membrane and the bottom surface, and the second gap is greater than or equal to 0.1 mm and less than or equal to 3 mm.

8. The microphone module according to claim 1, further comprising a multi-layer colloid, and the multi-layer colloid is disposed in the recess of the casing.

9. The microphone module according to claim 8, wherein the waterproof membrane and the limiting member are respectively sandwiched between any two layers of the multi-layer colloid and connected to the casing through the multi-layer colloid.

10. The microphone module according to claim 1, further comprising a circuit board and a circuit assembly, wherein the circuit board is disposed in the casing, at least part of the circuit assembly is disposed in the casing, and the microphone is connected to the circuit board.

* * * * *